United States Patent
Kinoshita

(10) Patent No.: US 8,042,671 B2
(45) Date of Patent: Oct. 25, 2011

(54) ONE-WAY CLUTCH OF ROLLER TYPE

(75) Inventor: Yoshio Kinoshita, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 485 days.

(21) Appl. No.: 12/362,341

(22) Filed: Jan. 29, 2009

(65) Prior Publication Data

US 2009/0242346 A1 Oct. 1, 2009

(30) Foreign Application Priority Data

Mar. 25, 2008 (JP) ................................. 2008-078347

(51) Int. Cl.
*F16D 3/34* (2006.01)

(52) U.S. Cl. ........................................................ 192/45

(58) Field of Classification Search .................. 192/38, 192/45; 188/82.84
See application file for complete search history.

(56) References Cited

U.S. PATENT DOCUMENTS

| | | | |
|---|---|---|---|
| 3,190,417 A * | 6/1965 | Bacon .............................. | 192/45 |
| 3,656,591 A | 4/1972 | Marland et al. | |
| 4,932,508 A | 6/1990 | Lederman | |
| 5,279,400 A | 1/1994 | Riggle et al. | |
| 5,328,010 A | 7/1994 | Lederman | |
| 6,848,552 B2 * | 2/2005 | Miller .............................. | 192/45 |
| 7,740,118 B2 * | 6/2010 | Shirataki et al. ................ | 192/45 |
| 2004/0139743 A1 | 7/2004 | Sato | |
| 2005/0034951 A1 | 2/2005 | Takasu | |
| 2007/0246318 A1 | 10/2007 | Shirataki et al. | |
| 2010/0116611 A1 | 5/2010 | Shirataki et al. | |
| 2010/0258398 A1 | 10/2010 | Shirataki et al. | |

FOREIGN PATENT DOCUMENTS

| | | |
|---|---|---|
| JP | 08-061192 A | 3/1996 |
| JP | 2003-172377 A | 6/2003 |
| JP | 2004-346951 A | 12/2004 |
| JP | 2007-064475 A | 3/2007 |

* cited by examiner

*Primary Examiner* — David D Le
*Assistant Examiner* — David J Hlavka
(74) *Attorney, Agent, or Firm* — Miles & Stockbridge P.C.

(57) ABSTRACT

A one-way clutch of roller type comprising an outer race having pockets provided at an inner surface thereof with cam surfaces, an inner race spaced inwardly from the outer race, a plurality of rollers disposed in the pockets and adapted to transmit torque between the outer race and the inner race, a cage having a cylindrical portion, a flange portion and windows to hold the plurality of rollers and each having a circumferential width smaller than a diameter of the roller, and springs each having one end locked to the outer race to bias the roller toward, and wherein the cage is rotatable relative to the outer race and includes staking portions formed on an end face of the cylindrical portion opposite to the flange portion and adapted to prevent the cage from being dislodged in an axial direction.

5 Claims, 6 Drawing Sheets

ONE-WAY CLUTCH OF ROLLER TYPE

This application claims priority from Japanese Patent Application No. 2008-078347 filed Mar. 25, 2008, which is hereby incorporated by reference herein.

BACKGROUND OF THE INVENTION

1. Field of the Invention

The present invention relates to a one-way clutch of roller type used as a torque transmitting element or a back stopper in a driving apparatus of a motor vehicle, an industrial machine and the like, for example.

2. Related Background Art

In general, a one-way clutch of roller type is comprised of an outer race, an inner race disposed in concentric with the outer race, a plurality of rollers disposed between an outer peripheral surface of the inner race and an inner peripheral cam surface of the outer race and adapted to transmit torque, and springs contacted with idle rotation sides of the rollers.

With this arrangement, in the one-way clutch, the inner race is designed so as to be rotated only in one direction with respect to the outer race by means of a cam mechanism constituted by the rollers and the cam surfaces. That is to say, the inner race is designed so that it is idly rotated relative to the outer race in one direction, and on the other hand, it applies rotational torque to the outer race through the cam mechanism only in an opposite direction.

Further, to obtain positive engagement, the one-way clutch of roller type must be constructed so that the rollers as torque transmitting members and the springs for biasing the rollers are not dislodged from respective pockets axially and radially.

In particular, in a one-way clutch of roller type of a motor bike, since the number of rollers is small (for example, three or six), if the respective rollers are not engaged positively, a design torque capacity may not be maintained.

Japanese Patent Application Laid-open No. 8-61192 (1996) discloses a one-way clutch of roller type in which a plurality of projections are provided in an opening portion of an outer race so that rollers and springs are prevented from being dislodged when the one-way clutch of roller type is assembled to an engine of an automatic motor bike.

Japanese Patent Application Laid-open No. 2004-346951 discloses a one-way clutch in which accommodating portions for accommodating rollers and compression springs are not required to be formed separately by providing a base plate having recesses for accommodating the rollers and the compression springs together, thereby suppressing a manufacturing cost.

As disclosed in the above-mentioned Japanese Patent Application Laid-open No. 8-61192 (1996) and Japanese Patent Application Laid-open No. 2004-34695, in the one-way clutches used as starters of the motor bikes, there is no adequate countermeasure in which, during a process for assembling the roller clutch with the outer race incorporating the outer race, rollers and springs, the rollers or sprags are prevented from being dislodged and the rollers and the springs are prevented from being dropped during the clutch is assembled to the motor bike. Further, additional side plates and additional drilling operations must be provided, thereby increasing the manufacturing cost.

SUMMARY OF THE INVENTION

Accordingly, an object of the present invention is to provide a one-way clutch of roller type which can be manufactured cheaply and be transported and assembled easily and has engagement reliability.

To achieve the above object, the present invention provides a one-way clutch of roller type comprising an outer race having pockets provided at an inner surface thereof with cam surfaces, an inner race spaced inwardly from the outer race in a radial direction and rotatably disposed in concentric with the outer race and having an annular outer peripheral track surface, a plurality of rollers disposed in the pockets and adapted to transmit torque between the outer race and the inner race when engaged by the cam surfaces, a cage having a cylindrical portion, a flange portion extending outwardly from the cylindrical portion in the radial direction and windows provided in the cylindrical portion and adapted to hold the plurality of rollers and each having a circumferential width smaller than a diameter of the roller, and springs each having one end locked to the outer race and the other end for biasing the roller toward an engagement direction with respect to the cam surface, and wherein the cage can be rotated relative to the outer race and the cage includes staking portions formed on an end face of the cylindrical portion opposite to the flange portion and adapted to prevent the cage from being dislodged in an axial direction.

According to the one-way clutch of roller type of the present invention, the following effects can be obtained.

A one-way clutch of roller type which can be manufactured cheaply and can be transported and assembled easily and has engagement reliability can be provided.

By locking one ends of the springs to the outer race and by integrally assembling the cage (including the flange portion provided with the windows having widths smaller than the widths of the rollers and including, at its one end, the staking portions for preventing the cage from being dislodged from the outer race), outer race, springs and rollers, even in the assembling process, the dislodging of the rollers and the springs can be prevented, and, further, even during the transportation, the dislodging of the rollers and the springs can be prevented.

Further, by designing so that the cage can be rotated relative to the outer race, regarding the movement of the roller from an idle rotation condition to an engagement condition, even when a width of the pocket for holding the pocket is smaller than a width of the roller, the movement of the roller cannot be obstructed and the roller can be prevented from being dislodged in the radial direction.

Since a synchronous motion can be transmitted from the cage to the rollers, so long as at least one of the rollers is functioned, a reliable roller clutch having a fail-safe function capable of urging and biasing all of the rollers toward the engagement direction can be realized.

By providing the staking portions for preventing the cage from being dislodged in the axial direction on the end face of the cylindrical portion of the cage opposite to the flange portion, the dislodging of the cage can be prevented during the transportation of the one-way clutch and the handling of the one-way clutch can be facilitated. Further, a problem that quality of the one-way clutch is worsened due to the dislodging of the cage, rollers and springs can be solved.

Further, by attaching the flange portion to the associated member, even in an environmental condition where great vibration is generated such as in the motor bike, the cage and/or the rollers and/or the springs can be prevented from being dislodged from the outer race.

Further features of the present invention will become apparent from the following description of exemplary embodiments with reference to the attached drawings.

DETAILED DESCRIPTION OF THE INVENTION

Now, embodiments of the present invention will be fully explained with reference to the accompanying drawings. Incidentally, it should be noted that the embodiments which will be described below are merely examples and other alterations and modifications can be made.

Figure 1:
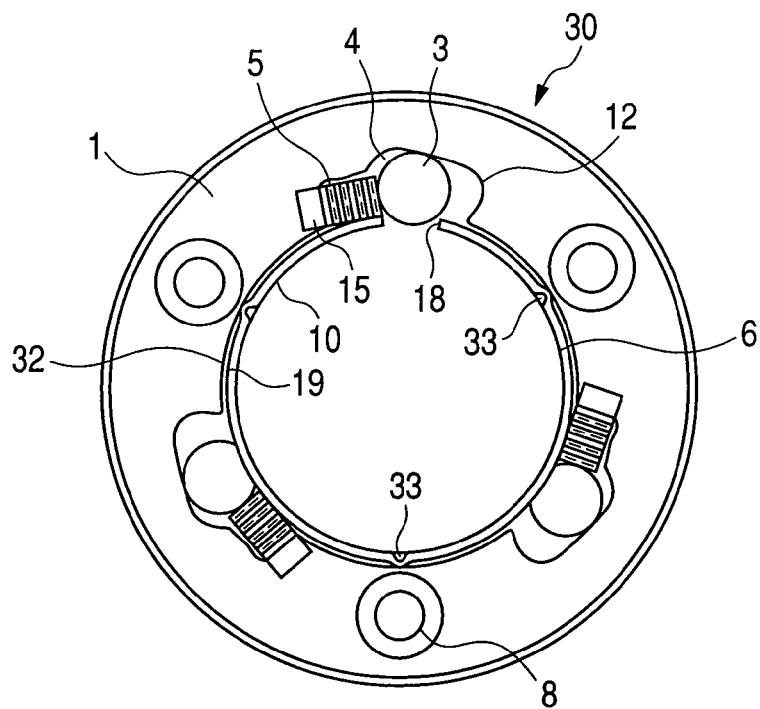
FIG. 1 is a front view of a one-way clutch of roller type according to an embodiment of the present invention, showing a condition prior to engagement.
Figure 2:
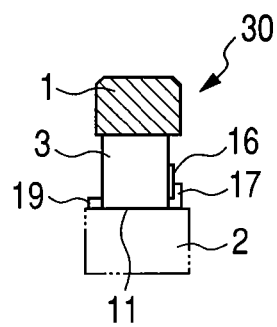
FIG. 2 is a sectional view taken along the line A-A of FIG. 3.
Figure 2:
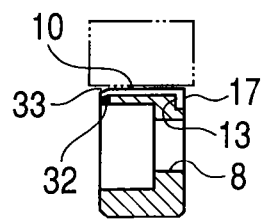
Figure 3:
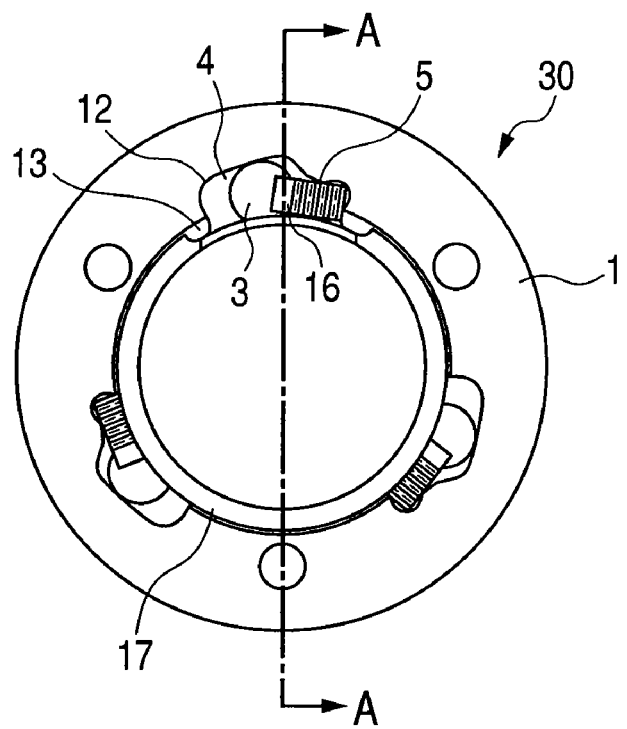
FIG. 3 is a front view looked at from a rear side of FIG. 1.

FIG. 1 is a front view showing a one-way clutch of roller type according to an embodiment of the present invention, and FIG. 3 is a front view looked at from a rear side of FIG. 1. Further, FIG. 2 is a sectional view taken along the line A-A of FIG. 3.

FIGS. 1 to 3 show a condition before rollers are engaged, i.e. an idle rotation condition that the one-way clutch is not locked. In the illustrated embodiment, an inner race 2 is idly rotated.

As shown in FIG. 1, a one-way clutch 30 of roller type comprises an annular outer race 1 provided at its inner periphery with pockets 4 formed as recesses having cam surfaces 12, an inner race 2 (shown by the imaginary line in FIG. 2) spaced inwardly from the outer race 1 in a radial direction and rotatably disposed in a concentric with the outer race and having an annular outer peripheral track surface 11, a plurality of rollers 3 disposed in the pockets 4 and adapted to transmit torque between the outer peripheral track surface 11 of the inner race 2 and the cam surfaces 12, and a cage 6 for holding the plurality of rollers 3. The cage 6 is not secured to both of the outer race 1 and inner race 2 and can be rotated relative to the outer race 1 and the inner race 2.

Three pockets 4 equidistantly disposed in a circumferential direction are provided in the outer race 1. Further, axially extending stepped bolt through holes 8 used for securing the outer race 1 to an input/output member (not shown) are also provided to be equidistantly arranged in the circumferential direction. As shown in FIG. 1, the pockets 4 and the bolt holes 8 are arranged alternately and equidistantly in the circumferential direction. Further, it should be noted that the number of the pockets 4 can be selected in accordance with the magnitude of the torque, for example, between three and six.

As shown in FIG. 2 and FIG. 3, the cage 6 for holding the rollers 3 comprises a cylindrical portion 10 and an annular flange portion 17 extending radially outwardly from an axial one end of the cylindrical portion 10. Further, the cage 6 has radially extending through windows 18 the number of which corresponds to the number of the rollers 3. Incidentally, in FIG. 3, the flange portion 17 is shown as a partial fragmental view so as to make the pocket 4 visible. A circumferential width of the window 18 is slightly smaller than a circumferential width of the roller 3. Thus, the roller cannot be dislodged from the window 18 in an inner diameter direction.

As shown in FIG. 1 and FIG. 3, the one-way clutch 30 of roller type includes springs 5 disposed in the corresponding pockets 4 and adapted to bias the rollers 3 toward an engagement direction with respect to the cam surfaces 12.

One end i.e. tab 15 of each spring is fixed or locked to an axial end face of the outer race 1, as shown in FIG. 1, and the other end i.e. tab 16 of the spring is pinched between an axial end face of the roller 3 and the flange portion 17 of the cage 6, as shown in FIG. 3. With this arrangement, the spring 5 itself is fixedly supported with respect to the outer race 1.

Although the spring 5 used in the present invention is an accordion spring, other type of spring, including a coil spring or the like, can be used.

As shown in FIG. 1 and FIG. 2, on an end face of the cylindrical portion 10 of the cage 6 opposite to the flange portion 17, there is provided pawl-shaped staking portions 33 for preventing the cage 6 from being dislodged in the axial direction. The staking portions 33 are arranged in positions different from positions of the pockets 4. Further, as can be seen from FIG. 1, three staking portions 33 are provided equidistantly along the circumferential direction.

As will be fully described in connection with FIGS. 4 to 6, the staking portions 33 are provided to be protruded radially outwardly from the cylindrical portion 10 and are engaged by an annular stepped portion 32 provided on an axial edge portion of the inner peripheral surface of the outer race 1. In this way, the cage 6 can be prevented from being dislodged in the axial direction. After the cage 6 is mounted on the outer race 1, the staking portions 33 are formed.

The staking portions 33 can be formed by caulking. Further, the number of the staking portions is not necessarily limited to three, and thus, is selected voluntarily to, for example, one, two, four or more.

Each window 18 provided in the cylindrical portion 10 of the cage 6 extends through the cylindrical portion in the radial direction; but, in the axial direction, the window is closed at a side of the flange portion 17 and at a side of an end portion 19 opposite to the flange portion 17. That is to say, the roller 3 is seated in the substantially rectangular window 18 and is supported by four sides of the window 18. In order to clarify a relationship between the window 18 and the roller 3, in FIG. 1, the uppermost window 18 is shown with the end portion 19 removed.

Since one axial end of the roller 3 is supported by one side of the window 18 and the other end is also supported by one side of the window 18, the roller can be prevented from being dislodged in the axial direction.

As shown in FIG. 2 and FIG. 3, an annular stepped portion 13 is provided on an axial edge portion of the inner peripheral surface of the outer race 1, and the flange portion 17 of the cage 6 is engaged by the stepped portion 13. An axial depth of the stepped portion 13 is slightly greater than a thickness of the flange portion 17 so that, when the flange portion 17 is engaged by the stepped portion 13, the axial end face of the flange portion 17 becomes slightly lower than the axial end face of the outer race 1. Further, an outer diameter of the flange portion 17 is slightly smaller than an outer diameter of the stepped portion 13. Thus, the cage 6 is rotatable relative to the outer race 1.

Next, a construction of the staking portion 33 will be explained in more detail with reference to FIGS. 4 to 6. As mentioned above, the staking portion 33 is formed by protruding the edge portion of the cylindrical portion 10 of the cage 6 radially outwardly and is engaged by the annular stepped portion 32 provided on the axial edge portion of the inner peripheral surface of the outer race 1.

Figure 4:
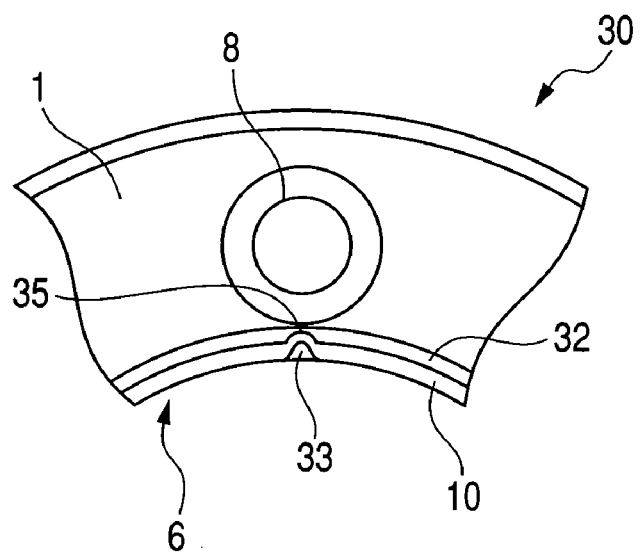
FIG. 4 is an enlarged view of a portion of FIG. 1.

FIG. 4 is an enlarged view of a portion of FIG. 1. Since an outer diameter of a radial tip portion 35 of the staking portion 33 is set to be slightly smaller than an outer diameter of the stepped portion 32, the cage 6 and the outer race 1 can be rotated relative to each other, without interference between the staking portion 33 and the outer race 1.

Figure 5:
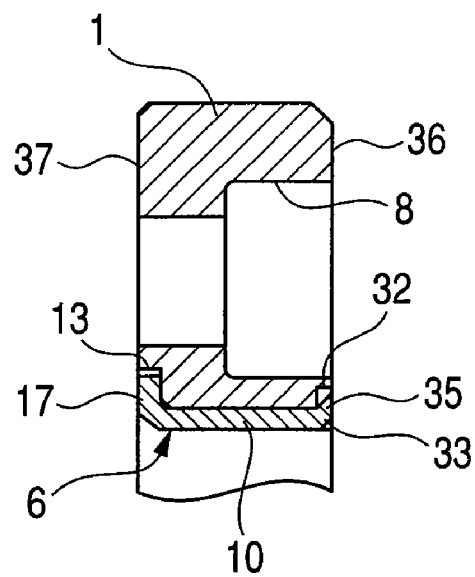
FIG. 5 is an axial sectional view of FIG. 4.

FIG. 5 is an axial sectional view of FIG. 4, showing a condition that the staking portion 33 is engaged by the stepped portion 32 of the outer race 1. The axial end of the staking portion 33 is slightly lower than an axial end face 36 of the outer race 1. Similarly, the axial end face of the flange portion 17 is slightly lower than an opposite axial end face 37 of the outer race 1. Accordingly, when the outer race 1 is attached to an associated member (not shown), both axial ends of the cage 6 do not interfere with the associated member.

Figure 6:
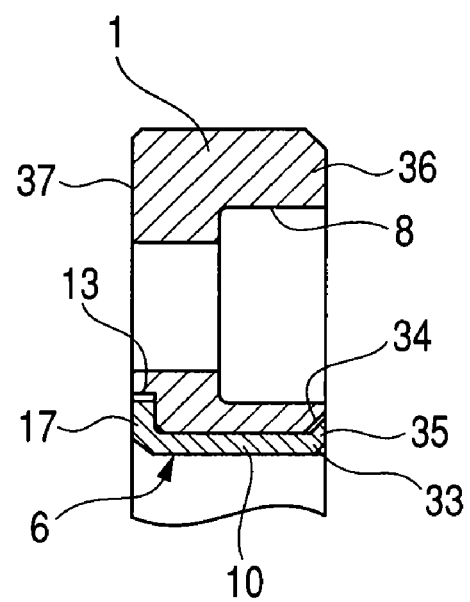
FIG. 6 is an axial sectional view similar to FIG. 5, showing an alteration of a stepped portion.

FIG. 6 is an axial sectional view similar to FIG. 5, showing an alteration of the stepped portion. In this example, a stepped portion of the outer race 1 is formed a chamfered portion 34 having an annular inclined surface. A predetermined clearance is provided between the inclined surface of the chamfered portion 34 and an inclined surface of the staking portion 33.

As can be seen from FIG. 5 and FIG. 6, the cage 6 is prevented from being dislodged in both axial directions by the flange portion 17 and the staking portion 33. By locking the ends 15 of the springs to the outer race 1 and by integrally assembling the cage 6 (including the flange portion 17 provided with the windows 18 having widths smaller than the widths of the rollers and including, at its one end, the staking portions 33 for preventing the cage from being dislodged from the outer race 1), outer race 1, springs 5 and rollers 3, even in the assembling process, the dislodging of the rollers 3 and the springs 5 can be prevented, and, further, even during the transportation, the dislodging of the rollers 3 and the springs 5 can be prevented.

Figure 7:
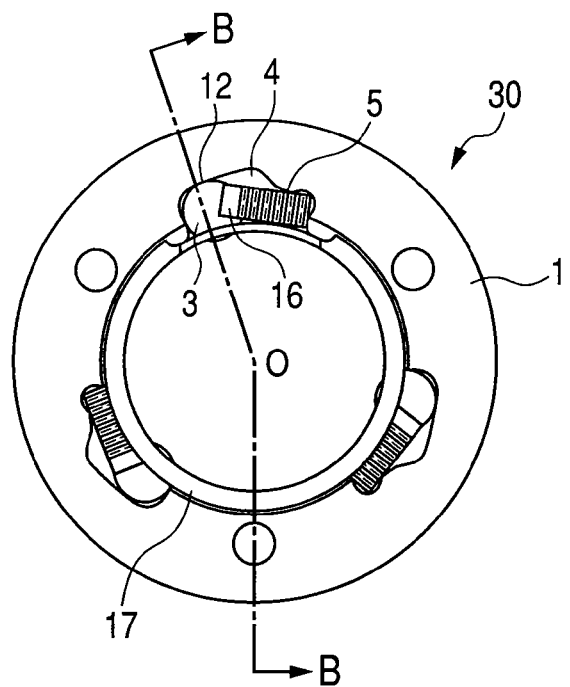
FIG. 7 is a front view of the one-way clutch of roller type according to the embodiment of the present invention, showing an engagement condition.
Figure 8:
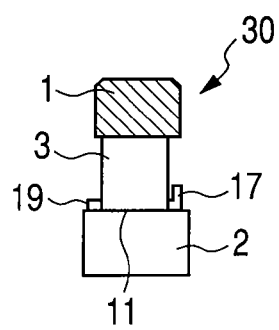
FIG. 8 is a sectional view taken along the line B-O-B in FIG. 7.
Figure 8:
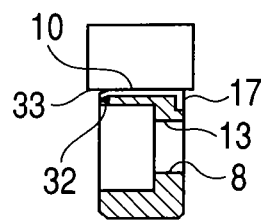

FIG. 7 is a front view showing a one-way clutch of roller type according to the embodiment of the present invention, and FIG. 8 is a sectional view taken along the line B-O-B in FIG. 7.

FIG. 7 and FIG. 8 show a condition that the rollers are engaged by the cam surfaces, i.e. a condition that the one-way clutch is engaged under a high load and is locked.

From an idle rotation condition shown in FIGS. 1 to 3, when a load for operating the clutch is applied, the rollers 3 biased by the springs 5 are engaged with the cam surfaces 12 of the pockets 4. In this case, the cage 6 is shifted together with the rollers 3 as the rollers 3 are displaced in the circumferential direction. Thus, the windows 18 are also shifted together with the rollers 3.

In this case, since axial one end face of each roller 3 is supported by the tab 16 of the spring 5 and the other end face is supported by the window 18, the roller can be operated stably without being dislodged in the axial direction.

The roller 3 is engaged by the cam surface 12, and, at the same time, the peripheral surface of the roller protruded radially inwardly from the window 18 is engaged by the outer peripheral surface of the inner race 2. Accordingly, the relative rotation between the outer race 1 and the inner race 2 is locked through the rollers 3.

As mentioned above, by designing so that the cage 6 does not have any rotation stopper and can be rotated freely, the rollers 3 themselves can shift the cage 6 and each rollers 3 can be moved by a distance greater than the width of the window 18. In FIG. 7, at the opposite side in the axial direction, the above-mentioned staking portions 33 are provided on the cylindrical portion 10 of the cage 6.

Figure 9:
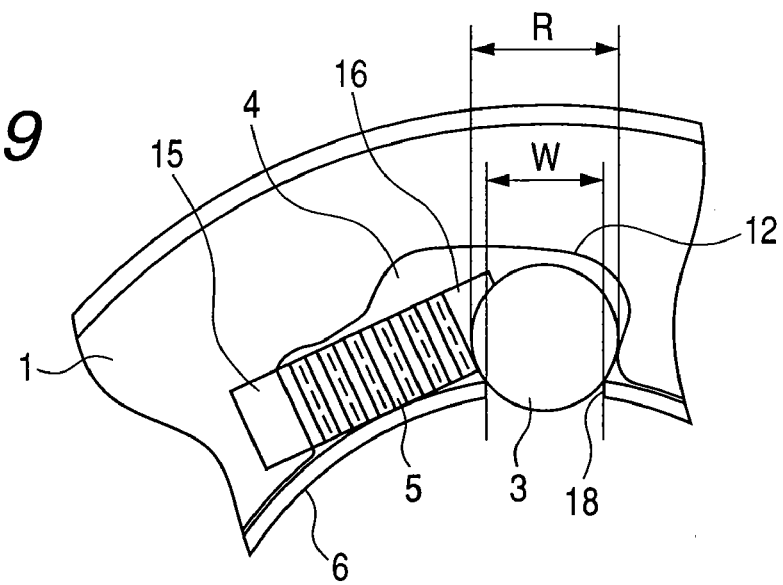
FIG. 9 is a partial front view of the one-way clutch of roller type before an inner race is mounted.

FIG. 9 is a partial front view of the one-way clutch of roller type before the inner race is mounted. Each roller 3 is biased by the spring 5 to be urged against the cam surface 12 and is seated in the window 18 of the cage 6 by its own weight.

As shown in FIG. 9, since a circumferential width W of the window 18 of the cage 6 is smaller than a diameter R of the roller 3, the roller 3 can be seated in the window 18. As mentioned above, since the cage 6 is not secured to the outer race 1 and the inner race 2, it can be rotated freely; however, since the rollers 3 are fitted in the windows 18, when the rollers 3 are displaced in the pockets 4, the cage 6 is also rotated accordingly.

Figure 10:
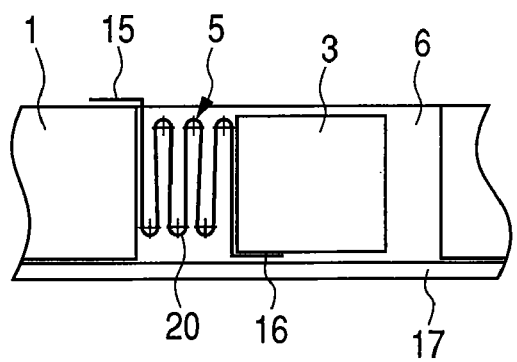
FIG. 10 is a partial side view looked at from an inner diameter side in FIG. 9.

FIG. 10 is a partial side view of FIG. 9 looked at from an inner diameter side. The spring 5 has a tab 15 bent at a substantially right angle from a bellows-shaped body portion 20, which tab 15 is engaged by the axial one end face of the outer race 1. Further, at the end of the spring opposite to the tab 15, the spring is provided with a tab 16 bent at a substantially right angle from the body portion 20, which tab 16 is engaged by the axial one end face of the roller 3.

The tab 16 engaged by the roller 3 is pinched between the axial end face of the roller 3 and the flange portion 17 of the cage 6. Accordingly, the tab 16 holds the roller 3 in the axial direction, and the spring 5 itself is also supported by the engagement between the outer race 1 and the roller 3. In this way, since the spring 5 is maintained in a fixed condition, the spring does not rattle in the pocket 4, thereby preventing wear of the spring 5.

Figure 11:
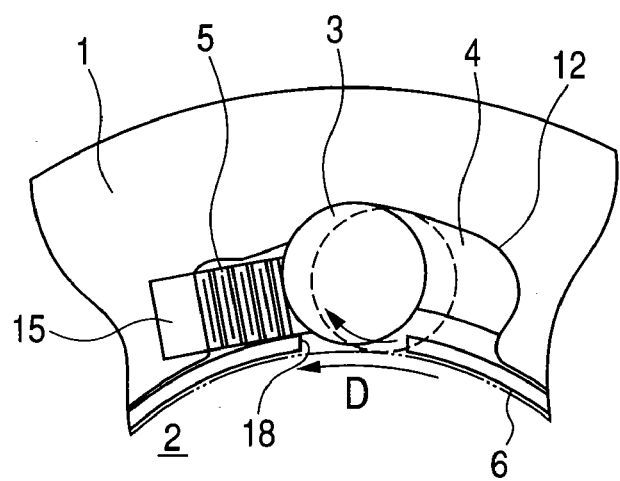
FIG. 11 is a partial front view for explaining an operation of the one-way clutch of roller type, showing a condition that the inner race is idly rotated.
Figure 12:
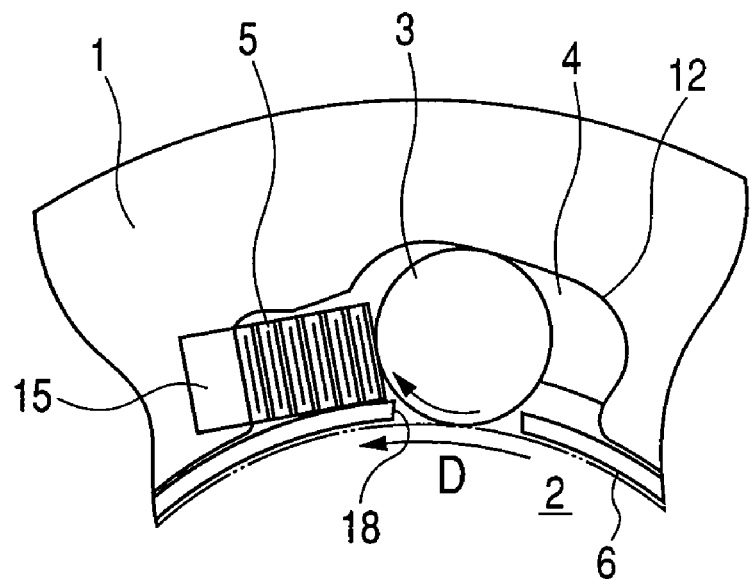
FIG. 12 is a partial front view for explaining an operation of the one-way clutch of roller type, showing a transition condition that the inner race is being reversed from the idle rotation condition.
Figure 13:
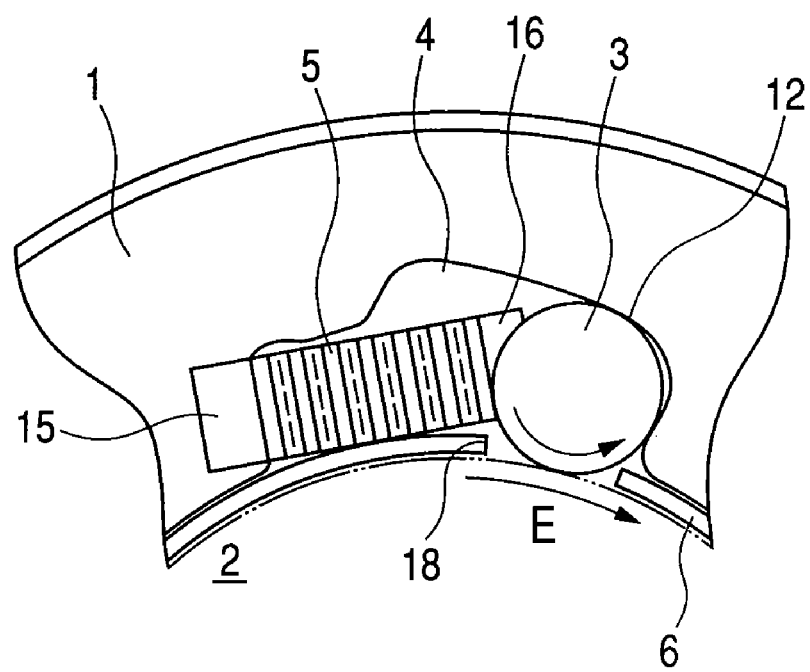
FIG. 13 is a partial front view for explaining an operation of the one-way clutch of roller type, showing a condition that the inner race is reversed.

FIGS. 11 to 13 are partial front views for explaining an operation of the one-way clutch of roller type, where FIG. 11 shows an idle rotation condition of the inner race, FIG. 12 shows a transition condition that the inner race is being shifted from the idle rotation condition to a reverse condition and FIG. 13 shows the reverse condition of the inner race.

In FIG. 11, the inner race 2 is rotated in a direction shown by the arrow (idly rotated). In this case, due to the rotation of the inner race 2, together with the window 18 of the cage 6, the roller is shifted toward the spring 5 in the pocket 4. That is to say, since the roller is shifted together with the cage 6 in the rotational direction of the inner race 2, the roller 3 is shifted to the left in opposition to the biasing force of the spring 5, while rotating in the direction shown by the arrow, as shown.

FIG. 12 shows a condition that, before the inner race 2 is reversed, a speed of the rotation (idle rotation) in the direction shown by the arrow is decreased, with the result that a force for displacing the roller 3 to the left is reduced. In this condition, the roller 3 is displaced toward the cam surface 12 by the biasing force of the spring 5, but is not engaged by the cam surface 12.

When the inner race 2 starts to be rotated in an opposite direction of FIGS. 11 and 12 (i.e. direction shown by the arrow in FIG. 13), the load on the roller 3 is disappeared or lost, with the result that the roller 3 is displaced to a position where the roller is engaged by the cam surface 12, by the biasing force of the spring 5 and by the displacement of the window 18 of the cage 6 shifted by the reverse rotation of the inner race 2. This condition is shown in FIG. 13. In this case, since the roller 3 follows the rotation of the inner race 2 together with the cage 6 to tray to rotate in the direction as shown, the roller is engaged by the cam surface 12 positively.

In the engagement high load condition shown in FIG. 13, the rotation of the inner race 2 is transmitted to the outer race 1 by the engagement between the roller 3 and the cam surface 12. That is to say, the inner race 2 and the outer race 1 are integrally rotated in the direction shown by the arrow.

The present invention is used as a part such as a torque transmitting element or a back stopper in a driving apparatus of an automobile, industrial machine and the like; however, particularly when used in a motor bike, the present invention provides excellent effects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A one-way clutch of roller type comprising:
an outer race having pockets provided at an inner surface thereof with cam surfaces;
an inner race spaced inwardly from said outer race in a radial direction and rotatably disposed in concentric with said outer race and having an annular outer peripheral track surface;
a plurality of rollers disposed in said pockets and adapted to transmit torque between said outer race and said inner race when engaged by said cam surfaces;
a cage having a cylindrical portion, a flange portion extending outwardly from said cylindrical portion in the radial direction, and windows provided in said cylindrical portion and adapted to hold said plurality of rollers and each having a circumferential width smaller than a diameter of said roller; and
springs each having one end locked to said outer race and the other end for biasing said roller toward an engagement direction with respect to said cam surface; and wherein
said cage can be rotated relative to said outer race, and said cage includes a staking portion formed on an end face of said cylindrical portion opposite to said flange portion and adapted to prevent said cage from being dislodged in an axial direction.

2. A one-way clutch of roller type according to claim 1, wherein an annular stepped portion is formed an axial edge portion of an inner peripheral surface of said outer race opposite to said flange portion of said cage in the axial direction, and said staking portion is engaged by said stepped portion in such a manner that said staking portion can be rotated relative to said outer race.

3. A one-way clutch of roller type according to claim 1, wherein an annular chamfered portion is formed an axial edge portion of an inner peripheral surface of said outer race opposite to said flange portion of said cage in the axial direction, and said staking portion is engaged by said chamfered portion in such a manner that said staking portion can be rotated relative to said outer race.

4. A one-way clutch of roller type according to claim 1, wherein one or more of said staking portions are provided between said pockets.

5. A one-way clutch of roller type according to claim 1, wherein said one-way clutch of roller type is attached to an associated member to which said outer race is attached at a side of said flange portion of said cage.

* * * * *